April 7, 1964 A. T. ABROMAITIS 3,128,412

PHOTOSENSITIVE BISTABLE SWITCHING CIRCUIT

Filed May 25, 1959

INVENTOR.
ANDRE T. ABROMAITIS
BY George H. Fritzinger
AGENT

3,128,412
PHOTOSENSITIVE BISTABLE SWITCHING CIRCUIT

Andre T. Abromaitis, East Orange, N.J., assignor to McGraw-Edison Company, Elgin, Ill., a corporation of Delaware Filed May 25, 1959, Ser. No. 815,656
1 Claim. (Cl. 315—159)

Figures 1, 2:
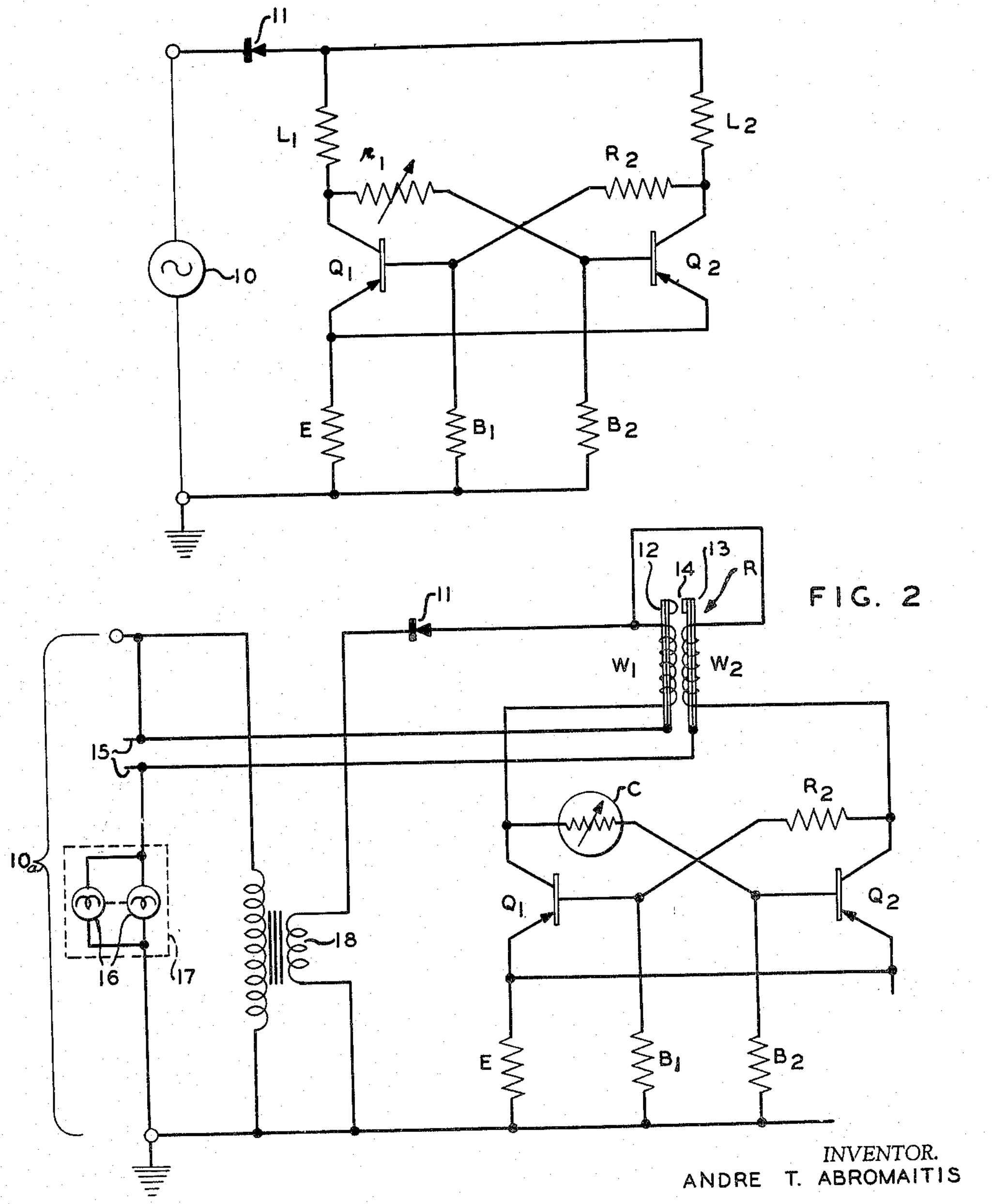

This invention relates to novel control systems using pulse-operated bistable circuits and more particularly it relates to a street lamp control system using such bistable circuit with an unbalancing photoconductive cell and an output relay of the thermal type having an operational time delay.

When bistable circuits are connected to a source of current they respond in one direction or the other according to slight unbalancing conditions but while the circuits are operated a wide variation in such condition is required to shift the response in the other direction.

An object of the present invention is to provide a control system using a bistable circuit operated from a pulse source of current to render the circuit directionally sensitive at the outset of each pulse to slight unbalancing conditions.

A further object of the invention is to provide a sensitive, reliable and economical control system responsive to the intensity of ambient light to turn on a street lamp after a short time delay when the ambient light intensity falls below a predetermined threshold, say 1 to 2 foot-candles, and to turn the light off after a similar such delay when the ambient light intensity rises above this threshold. The operational time delay is necessary so that temporary light intensity changes such as from lightning, passing clouds and passing lights of vehicles will not influence the system.

A further object is to provide a pulse-operated sensitive bistable control circuit using transistor amplifying devices and a differential thermal relay in the output to achieve maximum compactness, reliability and immunity to ambient temperature changes.

Further objects and features of the invention will be apparent from the following description and the appended claim.

In the description of the invention reference is had to the accompanying drawings, of which:

FIGURE 1 is a schematic circuit diagram of a transistor type bistable circuit according to the invention; and FIGURE 2 is a schematic circuit diagram of the present street-lamp control system using the aforesaid bistable circuit in connection with a differential type thermal relay.

With reference first to the bistable circuit shown in FIGURE 1, there are two amplifying devices, preferably transistors $Q_1$ and $Q_2$, for example, of the P–N–P type as shown. These transistors are connected across a voltage source 10, which as later described is preferably an A.C. source of voltage, through respective collector load resistors $L_1$ and $L_2$ and through a common emitter resistor E. The collector of the transistor $Q_1$ is connected through a variable resistor $r_1$ to the base of the transistor $Q_2$ and the collector of transistor $Q_2$ is connected through a fixed resistor $R_2$ to the base of the transistor $Q_1$. Furthermore, the bases of the transistors are connected respectively through fixed bias resistors $B_1$ and $B_2$ to the ground side of the potential source.

The transistors $Q_1$ and $Q_2$ are of the same type having substantially identical operating characteristics, and the analogous circuit components of the two transistor circuits are made substantially equal so as to provide a nearly symmetrical or balanced bistable system. However, because of slight unbalance in the symmetry of the system one transistor will begin to conduct current to a greater extent than the other when the circuit is connected to the source 10. This greater conductivity of one transistor reduces the base voltage on the other to cause the other to be cut off. For example, say the transistor $Q_1$ has in the first instance the greater conductivity. The reduced voltage drop across $Q_1$ operates through the voltage divider circuit of $r_1$ and $B_2$ to supply the base of transistor $Q_2$ with a substantially reduced voltage, a voltage even below that of the emitter of $Q_2$ to cause $Q_2$ to be completely cut off. Once this unbalanced state occurs considerable variation in the control resistor $r_1$ will not change the unbalance, but if the supply voltage is momentarily cut off and the resistor $r_1$ is varied to reverse the unbalance then the transistor $Q_2$ will next become fully conductive when the system is again connected to the source 10, and as the transistor $Q_2$ becomes conductive it operates through $R_2$ and $B_1$ to cut off the transistor $Q_1$, thus reversing the state of unbalance of the system. In order that the system may respond directionally in a highly sensitive manner to any slight change in unbalance in the circuits of the two transistors the system is connected to a pulse source of direct current provided by connecting the system through a rectifier 11, for example, a half-wave rectifier as shown, to the source 10 of A.C. voltage. Thus, one transistor will conduct in a pulsating manner while the other remains cut off unless and until the control resistor $r_1$ is varied to reverse the asymmetry of the circuit and cause the other transistor to conduct pulsatingly while the first is cut off, the action being that if the transistor $Q_1$ is pulsating a decrease in the value of the control resistor $r_1$ will cause the transistor $Q_2$ to begin pulsating while $Q_1$ is cut off, and vice versa. Alternatively, the direction of unbalance may be controlled by varying either of the bias resistors $B_1$ and $B_2$.

In FIGURE 2 the foregoing circuit is employed as a street lamp control in which the control resistor is constituted by a photoconductive cell C responsive according to the ambient light intensity. A suitable such cell may be an RCA 7163 cell of the cadmium sulphide type. Also, in this street lamp control system the collector load resistors are constituted by respective heater windings $W_1$ and $W_2$ of a differential relay R. The two bimetals of this relay, referred to as 12 and 13 respectively, have cooperating contacts 14 in close juxtaposition with each other to close and open responsive to a differential heating and cooling of one of the two bimetals, the advantage of using two bimetals in differential arrangement being that the relay is substantially insensitive to ambient temperature changes since the two bimetals move in the same direction without relative displacement to each other when both are heated alike. A further advantage of using a thermal relay is that it has an inherent time delay which can be varied within wide limits by changing the mass of the respective bimetals and/or the coefficient of coupling between either heater winding and the respective bimetal. The relay itself will thus provide the necessary operational delay for avoiding accidental operation from temporary changes in ambient light intensity, a suitable delay for the present purpose being of the order of 30 seconds. The contacts 14 are connected in a lighting circuit 15 to be controlled, which circuit is connected also across a power source $10_a$ and which includes one or more street lamps 16 as of one or more stanchions 17. When, however, the control system is connected across a voltage source of 110 volts or more, the bistable circuit is connected thereto through a voltage step-down transformer 18 as not to place excessive voltage across the transistors $Q_1$ and $Q_2$. A suitable voltage for the bistable system is around 26 volts.

By way of illustrative example the circuit components for the system shown in FIGURE 2 may be as follows:

$W_1$ and $W_2$, 2000 ohms each; $B_1$ and $B_2$, 51,000 ohms each; $R_2$, 10,000; E, 51 ohms; and photoconductive cell C about 1,000 ohms in daylight, 9,000 ohms at 3 foot-candles, 20,000 ohms at 1 foot-candle and 100,000 ohms or more at nighttime. The transistors may be of the type 2N554 and the transformer 18 may have an approximate 4.5 to 1 step-down voltage ratio.

The operation of the street lamp control system above-described is such that during daytime, as when the light intensity is above a suitable threshold of say 1 to 3 foot-candles, the resistance of the cell C is low to cause the transistor $Q_2$ to have a high bias and to be conductive. Pulsating current then flows through the winding $W_2$ causing the bimetal 13 to be deflected to the right into a contact-open position, it being understood that the winding $W_1$ is essentially not now energized. When the ambient light intensity next falls below this threshold, the resistance of the cell C increases sufficiently to reverse the direction of unbalance of the bistable circuit, causing the transistor $Q_1$ to become conductive and the transistor $Q_2$ to be cut off. Pulsating current now flows through the winding $W_1$ to deflect the bimetal 12 to the right after the time delay inherent in the relay. At the same time the bimetal 13 is cooling and returning gradually to its initial position because of the winding $W_2$ being substantially not now energized. As a result, the switch 14 is closed within a predetermined time delay following the reversal of the bistable circuit to connect the lamp circuit 15 across the power supply 10. Conversely, when the ambient light intensity next increases above the threshold of 1 to 3 foot-candles the bistable circuit is again reversed to open the switch 14 and turn off the street lamps after the prescribed time delay of the system.

The embodiments of my invention herein particularly shown and described are intended to be illustrative and not limitative of my invention since the same are subject to changes and modifications without departure from the scope of my invention, which I endeavor to express according to the following claim.

I claim:

A street lamp control comprising a bistable circuit of substantially symmetrical arrangement, including a pair of transistors respectively having base, emitter and collector electrodes, a fixed resistor connected between the collector electrode of one transistor and the base electrode of the other transistor, a photoconductive cell connected between the collector electrode of said other transistor and the base electrode of said one transistor for unbalancing the bistable circuit in one direction or the other according to whether the ambient light intensity is above or below a predetermined threshold, a pulsating source of current connected to said circuit for operating the same and for extinguishing the bistable circuit between pulses, a differential thermal relay comprising a pair of temperature responsive elements and respective heater windings therefor and a switch operable thereby with predetermined time delay responsive to a differential heating of said elements, means connecting said heater windings in said bistable circuit between said pulsating source and said respective collector electrodes to cause said switch to be operated according to the direction of unbalance of said bistable circuit, and a street lamp circuit controlled by said switch.

References Cited in the file of this patent

UNITED STATES PATENTS

| | | |
|---|---|---|
| 2,057,384 | Lamb | Oct. 13, 1936 |
| 2,476,389 | Schmidt | July 19, 1949 |
| 2,726,380 | Campisi | Dec. 6, 1955 |
| 2,798,965 | Goldfischer | July 9, 1957 |
| 2,891,195 | Smyth | June 16, 1959 |
| 2,913,599 | Benton | Nov. 17, 1959 |
| 2,939,018 | Faulkner | May 31, 1960 |

FOREIGN PATENTS

| | | |
|---|---|---|
| 201,974 | Australia | May 26, 1955 |
| 818,118 | Great Britain | Aug. 12, 1959 |